US011866978B2

(12) United States Patent
Worthen et al.

(10) Patent No.: US 11,866,978 B2
(45) Date of Patent: Jan. 9, 2024

(54) DOOR SWING CONTROL DEVICE AND ASSOCIATED METHOD

(71) Applicant: QUESTAR GAS COMPANY, Salt Lake City, UT (US)

(72) Inventors: Carter Worthen, Santaquin, UT (US); Bryan Yap, Long Beach, CA (US); Cameron Andersen, Herriman, UT (US); Jessica Rule, Los Angeles, CA (US); Todd Allen Bayliff, Salt Lake City, UT (US)

(73) Assignee: Questar Gas Company, Salt Lake City, UT (US)

( * ) Notice: Subject to any disclaimer, the term of this patent is extended or adjusted under 35 U.S.C. 154(b) by 338 days.

(21) Appl. No.: 17/109,013

(22) Filed: Dec. 1, 2020

(65) Prior Publication Data

US 2022/0170306 A1 Jun. 2, 2022

(51) Int. Cl.
*E05F 1/12* (2006.01)
*E05F 5/06* (2006.01)

(52) U.S. Cl.
CPC .............. *E05F 1/1292* (2013.01); *E05F 5/06* (2013.01); *E05Y 2900/544* (2013.01)

(58) Field of Classification Search
CPC ....... E05F 1/1292; E05F 1/1253; E05F 1/105; E05F 5/06; Y10T 16/5407; E05Y 2900/544; E05D 11/1007; E05D 11/06; E05D 3/127
See application file for complete search history.

(56) References Cited

U.S. PATENT DOCUMENTS

| | | | | |
|---|---|---|---|---|
| 3,651,539 | A | | 3/1972 | Breunich et al. |
| 3,698,781 | A | | 10/1972 | Dunn |
| 3,967,850 | A | * | 7/1976 | Whisler ................. B60J 5/0487 292/338 |
| 4,104,761 | A | * | 8/1978 | Lyons ..................... E05F 1/123 16/84 |
| 4,185,415 | A | * | 1/1980 | LaConte ................... E05D 3/06 49/248 |
| 4,263,853 | A | * | 4/1981 | Robertson ........... E05D 11/1007 105/410 |

(Continued)

FOREIGN PATENT DOCUMENTS

DE 2358186 C3 3/1978

*Primary Examiner* — Justin B Rephann
(74) *Attorney, Agent, or Firm* — Bernard G. Pike, Pike IP law

(57) ABSTRACT

A door swing control device comprises a bracket affixed to a door, a pivoting element pivotably affixed to the bracket, and a swinging catch mechanism mounted directly or indirectly to the structure. The pivoting element comprises a finger extending therefrom and is engaged with the bracket to limit a range of movement of the pivoting element relative to the bracket. The finger is engageable with the swinging catch mechanism to limit a range of movement of the pivoting element relative to the swinging catch mechanism and thereby selectively limiting a range of movement of the bracket relative to the swinging catch mechanism. When the finger of the pivoting element is engaged with the swinging catch mechanism, the door is held in the first open position. When the finger of the pivoting element is disengaged from the swinging catch mechanism, the door can swing between the first and second open positions.

12 Claims, 11 Drawing Sheets

(56) References Cited

U.S. PATENT DOCUMENTS

| | | | | |
|---|---|---|---|---|
| 4,341,413 | A | 7/1982 | Woods | |
| 4,383,347 | A * | 5/1983 | La Conte | E05F 1/1292 16/370 |
| 4,430,770 | A * | 2/1984 | Niekrasz | E05F 1/1292 16/349 |
| 5,561,887 | A * | 10/1996 | Neag | E05D 3/127 16/334 |
| 5,833,300 | A * | 11/1998 | Russke | B60J 7/145 296/108 |
| 5,901,415 | A | 5/1999 | Morrison et al. | |
| 6,038,738 | A * | 3/2000 | Neag | E05D 11/1007 16/371 |
| 6,174,022 | B1 | 1/2001 | Ashcroft | |
| 6,269,521 | B1 * | 8/2001 | Gabel | E05F 1/1276 16/361 |
| 6,460,915 | B1 | 10/2002 | Bedi et al. | |
| 6,520,557 | B2 * | 2/2003 | Benthaus | E05F 1/1091 296/76 |
| 7,032,953 | B2 * | 4/2006 | Rangnekar | E05F 1/1269 16/366 |
| 8,347,554 | B2 * | 1/2013 | Uto | E05C 17/14 49/394 |
| 8,651,556 | B2 | 2/2014 | Cutting | |
| 9,939,851 | B2 * | 4/2018 | Lan | F16M 11/10 |
| 10,487,556 | B2 * | 11/2019 | Hyun | E05F 1/1261 |
| 10,648,213 | B2 * | 5/2020 | Wright | E05D 11/1007 |
| 11,384,581 | B2 * | 7/2022 | Tomizawa | E06B 7/36 |
| 2011/0126469 | A1 * | 6/2011 | Uto | E02F 9/00 16/374 |
| 2011/0185637 | A1 * | 8/2011 | Uto | E02F 9/00 16/374 |
| 2018/0334321 | A1 | 11/2018 | Strasser et al. | |
| 2019/0160922 | A1 | 5/2019 | Hagedorn et al. | |

* cited by examiner

DOOR SWING CONTROL DEVICE AND ASSOCIATED METHOD

FIELD OF THE INVENTION

This invention relates to devices for controlling the opening and closing of a door.

BACKGROUND

It is common for work vehicles, especially vehicles used by utilities workers, to have several storage compartments accessible from outside the vehicle. Such storage compartments may include storage compartments with vertical hinges that on the right side or the left side such that the compartment door swings open outward toward the front or toward the rear of the vehicle (depending on which side the hinge is and on which side of the vehicle the compartment is) (these may be termed vertical compartments). Such storage compartments may also include storage compartments with horizontal hinges on the bottom or the top such that the compartment door swings open, respectively, downward or upward (this may be termed a horizontal compartment).

Conventional horizontal compartments with downward swinging doors typically have a chain, cable, or the like that supports the door in the open position in which the door is about 90 degrees from its closed position. Such a chain, cable, or the like prevents the door from swinging fully downward in an uncontrolled manner. However, having the door open at about 90 degrees may make it difficult for a worker to reach far into the cabinet. For this reason, workers sometimes disconnect the chain, cable, or the like to allow the door to swing completely downward (to about 180 degrees from the closed position). If the worker neglects to reattach the chain, cable, or the like before closing the door, the next time the door is opened the door may swing fully downward in an uncontrolled manner which may injure the worker.

What is needed is a device and method that enables doors (especially downward swinging horizontal doors) to be readily opened to a first open position that is about 90 degrees from the closed position and opened to a second open position that is about 180 degrees from the closed position.

BRIEF SUMMARY OF THE DISCLOSURE

In embodiments of the invention, a door swing control device is adapted to enable a door that is hingedly affixed to a structure to swing between a closed position and a first open position and between the first open position and a second open position. The door swing control device comprises a bracket adapted to be affixed to the door, a pivoting element pivotably affixed to the bracket or adapted to be pivotably affixed to the door, and a swinging catch mechanism adapted to be mounted directly or indirectly to the structure. The pivoting element is engaged with the bracket to limit a range of movement of the pivoting element relative to the bracket. The pivoting element comprises a finger extending therefrom. The finger is selectively engageable with the swinging catch mechanism to selectively limit a range of movement of the pivoting element relative to the swinging catch mechanism and thereby selectively limiting a range of movement of the bracket relative to the swinging catch mechanism. When the finger of the pivoting element is engaged with the swinging catch mechanism, the device is adapted to hold the door in the first open position. When the finger of the pivoting element is disengaged from the swinging catch mechanism, the device is adapted to allow the door to swing between the first open position and the second open position.

The device may further comprise a strut adapted to restrain movement of the door from the closed position to the first open position and/or from the first open position to the second open position. The strut is (a) adapted to be pivotably affixed at a first end to the structure and (b) pivotably affixed at a second end to the bracket or adapted to be pivotably affixed at the second end to the door.

The pivoting element may be adapted to pivot relative to the bracket between a first position and a second position as the door moves, respectively, between the closed position and the first open position.

The device may further comprise a pin protruding from the bracket that is slidably engaged with an arcuate channel defined in the pivoting element such that the slidable engagement limits the range of movement of the pivoting element relative to the bracket.

The bracket may comprise two parallel walls defining a space therebetween. The strut is pivotably affixed at the second end to the bracket such that a portion of the strut moves within a space between the two walls of the bracket as the strut moves relative to the bracket.

The swinging catch mechanism may be selectively pivotable between an engaged position in which the finger of the pivoting element is engaged with the swinging catch mechanism and a disengaged position in which the finger of the pivoting element is disengaged from the swinging catch mechanism. The swinging catch mechanism may be biased toward the engaged position.

The finger of the pivoting element may have a hooked distal end. The swinging catch mechanism may comprise a horizontal axle, one or more posts pivotably affixed to the axle, and a finger-engaging bar affixed to the one or more posts. The finger of the pivoting element may be selectively engageable with the finger-engaging bar.

The device may further comprise a release mechanism affixed to the finger-engaging bar to selectively pivot the finger-engaging bar and thereby pivot the swinging catch mechanism from its engaged position to its disengaged position The door may be horizontally hinged to the structure. In the first open position, the door is less than 90 degrees from the closed position and, in the second open position, the door is greater than 90 degrees from the closed position.

The structure may comprise a vehicle, and the door may comprise a compartment door to selectively close off an opening to a compartment of the vehicle.

In alternative embodiments of the invention, a door swing control device is adapted to enable a door that is hingedly affixed to a structure to swing between a closed position and a first open position and between the first open position and a second open position. The door swing control device comprises a bracket adapted to be affixed to the door, a pivoting element pivotably affixed to the bracket or adapted to be pivotably affixed to the door, and a finger adapted to be mounted directly or indirectly to the structure. The pivoting element is engaged with the bracket to limit a range of movement of the pivoting element relative to the bracket. The finger is selectively engageable with the pivoting element to selectively limit a range of movement of the pivoting element relative to the finger and thereby selectively limiting a range of movement of the bracket relative to the finger. When the finger is engaged with the pivoting element, the device is adapted to allow the door to swing between the closed position and the first open position. When the finger is disengaged from the pivoting element, the device is adapted to allow the door to swing between the first open position and the second open position.

The device may further comprise a strut adapted to restrain movement of the door from the closed position to the first open position and/or from the first open position to the second open position. The strut is (a) adapted to be pivotably affixed at a first end to the structure and (b) pivotably affixed at a second end to the bracket or adapted to be pivotably affixed at the second end to the door.

The pivoting element may be adapted to pivot relative to the bracket between a first position and a second position as the door moves, respectively, between the closed position and the first open position.

The device may further comprise a pin protruding from the bracket that is slidably engaged with an arcuate channel defined in the pivoting element such that the slidable engagement limits the range of movement of the pivoting element relative to the bracket.

The bracket may comprise two parallel walls defining a space therebetween. The strut is pivotably affixed at the second end to the bracket such that a portion of the strut moves within a space between the two walls of the bracket as the strut moves relative to the bracket.

The finger may be selectively pivotable between an engaged position in which the finger is engaged with the pivoting element and a disengaged position in which the finger is disengaged from the pivoting element. The finger may be biased toward the engaged position.

A channel may be defined in a distal end of the pivoting element, such that the finger is slidably engaged with the distal end channel when the finger is in the engaged position. The finger may be adapted to engage a first end of the distal end channel when the finger is in the engaged position and the door is in the first open position to prevent the door from moving to the second open position.

The door may be horizontally hinged to the structure. In the first open position, the door is less than 90 degrees from the closed position and, in the second open position, the door is greater than 90 degrees from the closed position.

The structure may comprise a vehicle, and the door may comprise a compartment door to selectively close off an opening to a compartment of the vehicle.

Further alternative embodiments of the invention comprise methods of controlling a swing of a door that is hingedly affixed to a structure between a closed position and a first open position and between the first open position and a second open position using door swing control devices disclosed herein.

BRIEF DESCRIPTION OF THE SEVERAL VIEWS OF THE DRAWINGS

Reference will now be made to the accompanying drawings, which are not necessarily drawn to scale. The following detailed description of the disclosure will be better understood when read in conjunction with the appended drawings. It should be understood, however, that the disclosure is not limited to the precise arrangements and instrumentalities shown. In the drawings.

DETAILED DESCRIPTION OF THE DISCLOSURE

Figure 1:
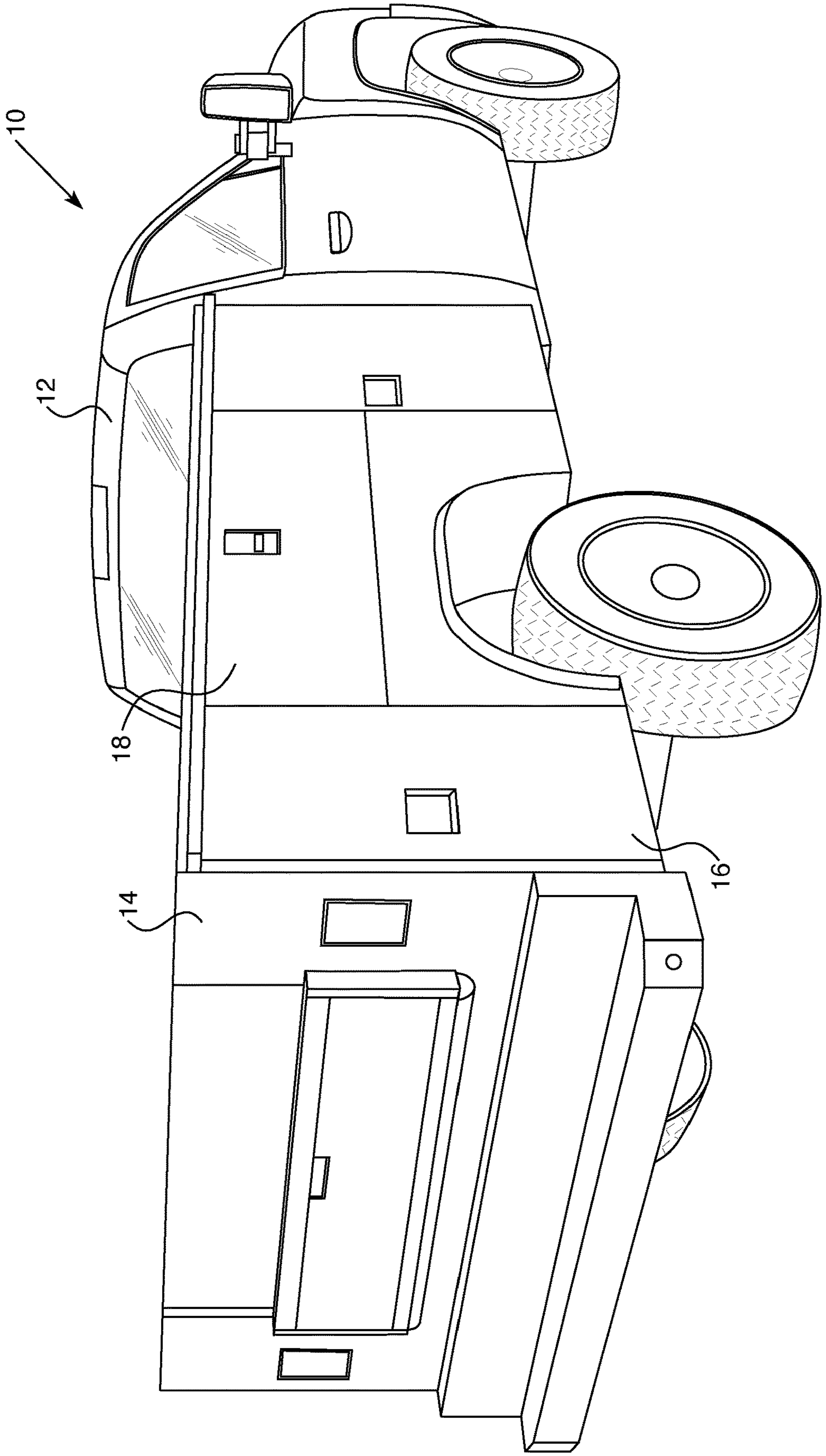
FIG. 1 is a perspective view of a vehicle in which embodiments of the invention may be installed.

Certain terminology is used in the following description for convenience only and is not limiting. The words "lower," "bottom," "upper," "top," and the like designate directions in the drawings to which reference is made. The words "inwardly," "outwardly," "upwardly," "downwardly," and the like refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Embodiments of the invention comprise a door swing control device adapted to enable a door that is hingedly affixed to a structure to swing between a closed position and a first open position and between the first open position and a second open position. The structure to which the door is attached may be (but is not necessarily) a vehicle, and the door may be (but is not necessarily) a downward swinging door of a horizontal storage compartment of a vehicle. The first open position may be (but is not necessarily) about 90 degrees from the closed position (it may be desirable to have the first open position to be slightly less than 90 degrees (e.g., 85-89 degrees) to prevent the door from contacting an open vertical door beneath the horizontal door when moving from the closed position to the first open position (contact between two such doors may form a pinch point that may injure a worker). The second open position is typically about 180 degrees from the closed position (or slightly less than 180 degrees), and may also be termed the "fully open position."

FIG. 1 illustrates a vehicle in which embodiments of the invention may be installed. The vehicle 10 of FIG. 1 has a cab portion 12 and a cargo portion 14. The cargo portion 14 of the vehicle 10 has three storage compartments visible on the passenger side (and likely more on the driver side that are not visible in FIG. 1). The front storage compartment and the rear storage compartment 16 have vertical hinges on the right side such that the door swings open outward toward the front of the vehicle (these may be termed vertical compartments), while the middle storage compartment 18 has a horizontal hinge on the bottom such that the door swings open downward (this may be termed a horizontal compartment). Embodiments of the invention are described herein in conjunction with the horizontal storage compartment 18, although embodiments of the invention may be used with many different types and arrangements of doors.

Referring now to FIGS. 2-8, a door swing control device of embodiments of the invention may comprise a left side device 30A and a right side device 30B. For simplicity, the structure and operation of only the left side device 30A will be described in detail herein; however, the right side device 30B is a mirror image of the left side device 30A. The left side device 30A is illustrated in detail in FIGS. 5, 6, and 8, while the right side device 30B is illustrated in somewhat less detail in FIG. 7. In some applications of the door swing control device of embodiments of the invention, only a single device (i.e., left side or right side) will be installed to control the opening of the door, while in other applications of the door swing control device of embodiments of the invention the device may be installed on both sides of the door.

The door swing control device of embodiments of the invention may be provided as an OEM (original equipment manufacturer) part (i.e., installed by the vehicle manufacturer or by the manufacturer/retrofitter of the vehicle cargo portion) or an after-market part that may be installed by the vehicle owner or by someone on the vehicle owner's behalf.

Figure 2:
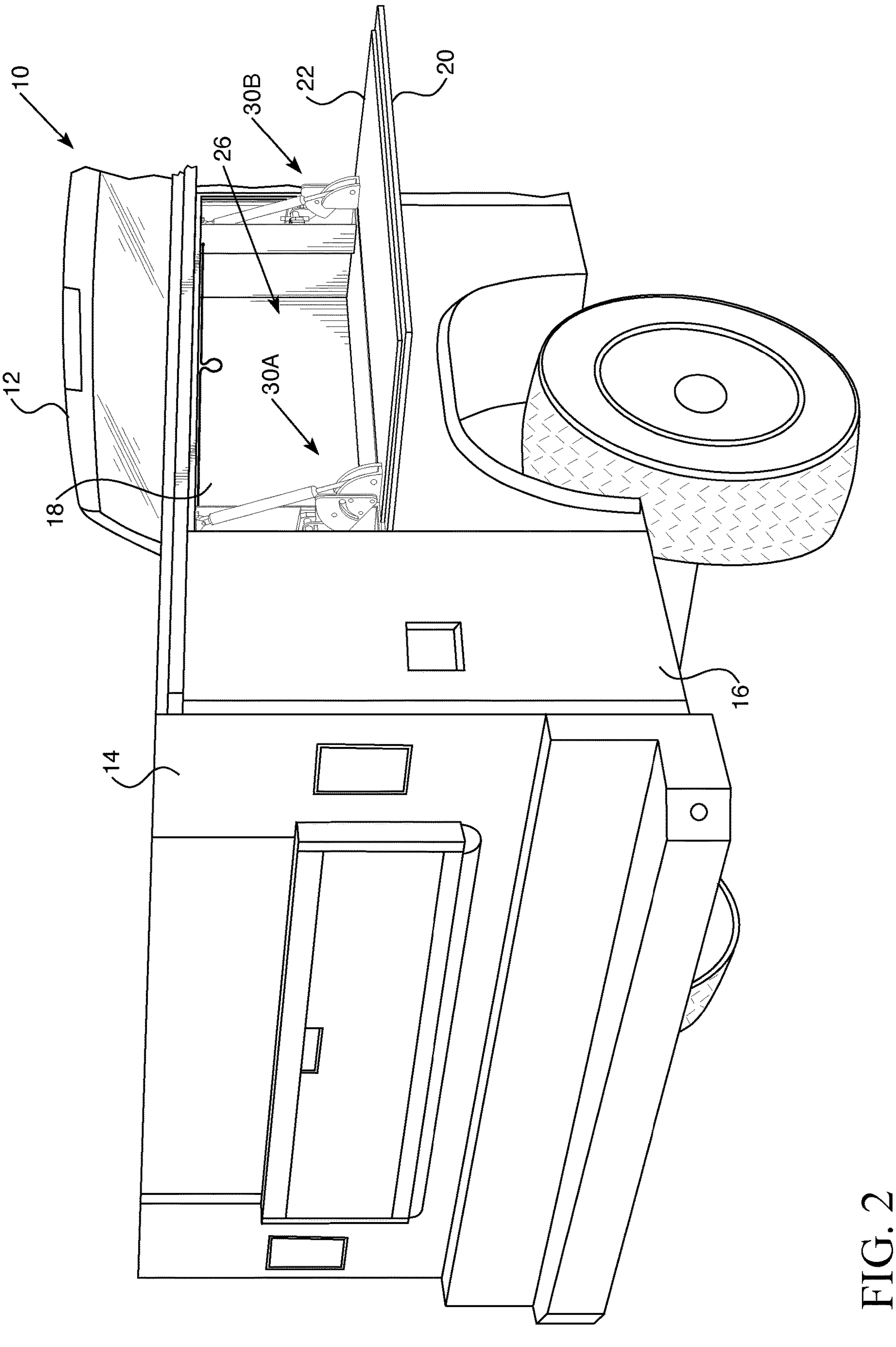
FIG. 2 is a perspective view of the vehicle of FIG. 1 with a compartment door open to a first position, showing a door swing control device installed on opposing sides of the compartment door.
Figure 3:
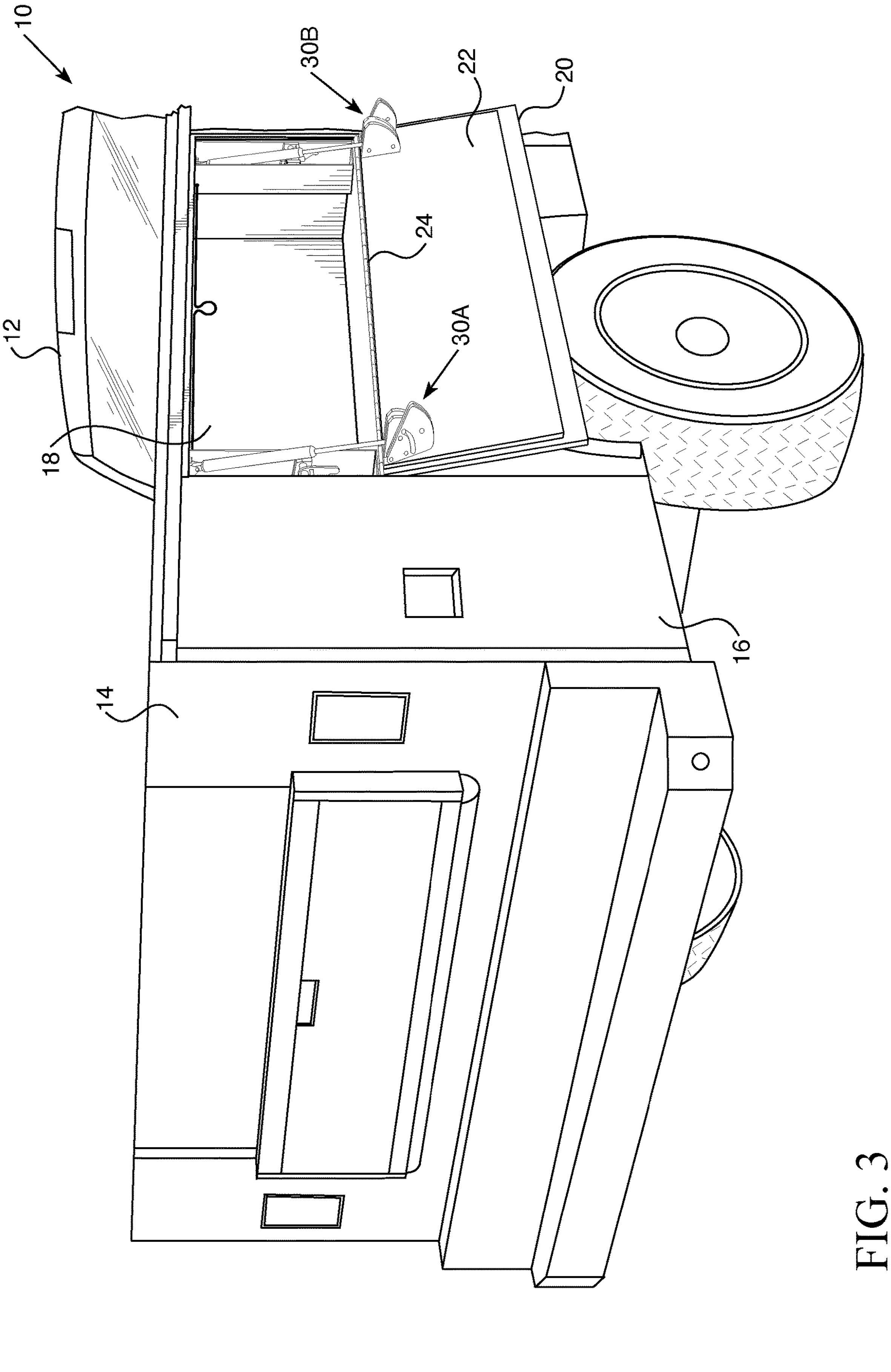
FIG. 3 is a perspective view of the vehicle of FIG. 1 with a compartment door open to a second position, showing the door swing control device of FIG. 2 installed on opposing sides of the compartment door.

FIG. 1 illustrates the door of the horizontal compartment 18 closed. FIG. 2 illustrates the door 20 of the horizontal compartment 18 open to the first open position (about 90 degrees from the closed position). FIG. 3 illustrates the door 20 of the horizontal compartment 18 open to the second open position (about 180 degrees from the closed position). When the door 20 is open, the interior chamber 26 of the compartment 18 is accessible. The door is attached to the vehicle via hinge 24. The door 20 has an interior wall 22 that is smaller than its exterior wall, thereby forming a shoulder around the top and two sides of the door 20. This optional shoulder mates with the inside top and side edges of the compartment.

When the horizontal compartment door is opened and lowered by a user to the first open position, the swing control device of embodiments of the invention initially stops the door at the first open position and prevents the door from further opening to the second open position. If the user can access the desired material from the compartment with the door at the first open position, the worker may do so and then close the door when done. However, if the user has difficulty accessing the desired material from the compartment with the door at the first open position, the user may activate a release mechanism (described below) that disengages the swing control device and allows the user to lower the door to the second open position. A pneumatic strut or the like controls the door opening speed from the closed position to the first open position and from the first open position to the second open position. After the user has accessed the desired material from the compartment with the door at the second open position, the user may then raise the door back to the first open position or fully close the door. Raising the door back to the first open position or fully closing the door re-engages the swing control device such that a subsequent opening of the door will again be stopped at the first open position by the swing control device.

The door swing control device 30A of embodiments of the invention comprises one or more components that are mounted in the interior chamber 26 of the compartment 18, one or more components that attaches to the door 20, and one or more components that cooperate with the internal components and the door-mounted components.

Some of the interior components of the door swing control device 30A are arranged in a housing 32 that is pre-configured to be installed in the interior chamber 26 of the storage compartment. The housing 32 may be generally shaped as a rectangular box and will typically have left and right side walls, a top wall, and a floor as illustrated, and likely a rear wall, but will likely not have a front wall (some or all of the walls may be partial walls). The housing 32 is mounted to one or more of the respective inner side wall, the inner top wall, and/or the inner floor of the compartment using any suitable mounting fasteners or method of mounting.

The device 30A comprises a bracket 48 that is affixed to the door 20. In the illustrated embodiment, the bracket 48 comprises two parallel, quarter-circle-shaped walls defining a space 50 therebetween. The device 30A comprises a pivoting element 58 that is pivotably affixed to the bracket 48 (or alternatively may be pivotably affixed to the door 20), via pivot point 60. As described below, the pivoting element 58 engages with the bracket 48 to limit the range of movement of the pivoting element 58 relative to the bracket 48. The pivoting element 58 pivots relative to the bracket 48 between a first position (shown in FIG. 4) and a second position (shown in FIG. 5) as the door moves, respectively, between the closed position and the first open position. A pin 64 protrudes from the bracket 48 that is slidably engaged with an arcuate channel 62 defined in the pivoting element 58, such that the slidable engagement limits the range of movement of the pivoting element 58 relative to the bracket 48.

The device 30A comprises a pneumatic strut 34 or the like that is pivotably affixed to the interior of the compartment (via mounting bracket 42 and pivot point 44) and is pivotably affixed to the door 20 (via pivot point 52 and the bracket 48) (the strut could optionally be affixed to the compartment and/or the door in any other suitable manner). The strut 34 comprises a main pneumatic housing 36 and an extendible piston 38, as is conventionally known. The strut 34 is pivotably affixed at the second end to the bracket 48 such that a portion of the strut 34 (typically a portion of the piston 38) moves within a space between the two walls of the bracket 48 as the strut 34 moves relative to the bracket 48. The strut 34 controls the speed of the door 20 as the door 20 moves from the closed position to the first open position and/or from the first open position to the second open position.

The device 30A comprises a finger 70 that is mounted directly or indirectly to the interior of the compartment. In the illustrated embodiment, the finger 70 is pivotably affixed to an axle 72, which in turn is affixed to a mounting bracket 74, which in turn is affixed to the housing 32 (the finger 70, axle 72, and bracket 74 may be mounted using any suitable mechanism or method). As described further below, the finger 70 is selectively engageable with the pivoting element 58 to selectively limit a range of movement of the pivoting element 58 relative to the finger 70 and thereby selectively limit a range of movement of the bracket 48 relative to the finger 70 and selectively limit movement of the door 20. When the finger 70 is engaged with the pivoting element 58, the device 30A allows the door 20 to swing between the closed position and the first open position. When the finger 70 is disengaged from the pivoting element 58, the device 30A allows the door 20 to swing between the first open position and the second open position.

Figure 4:
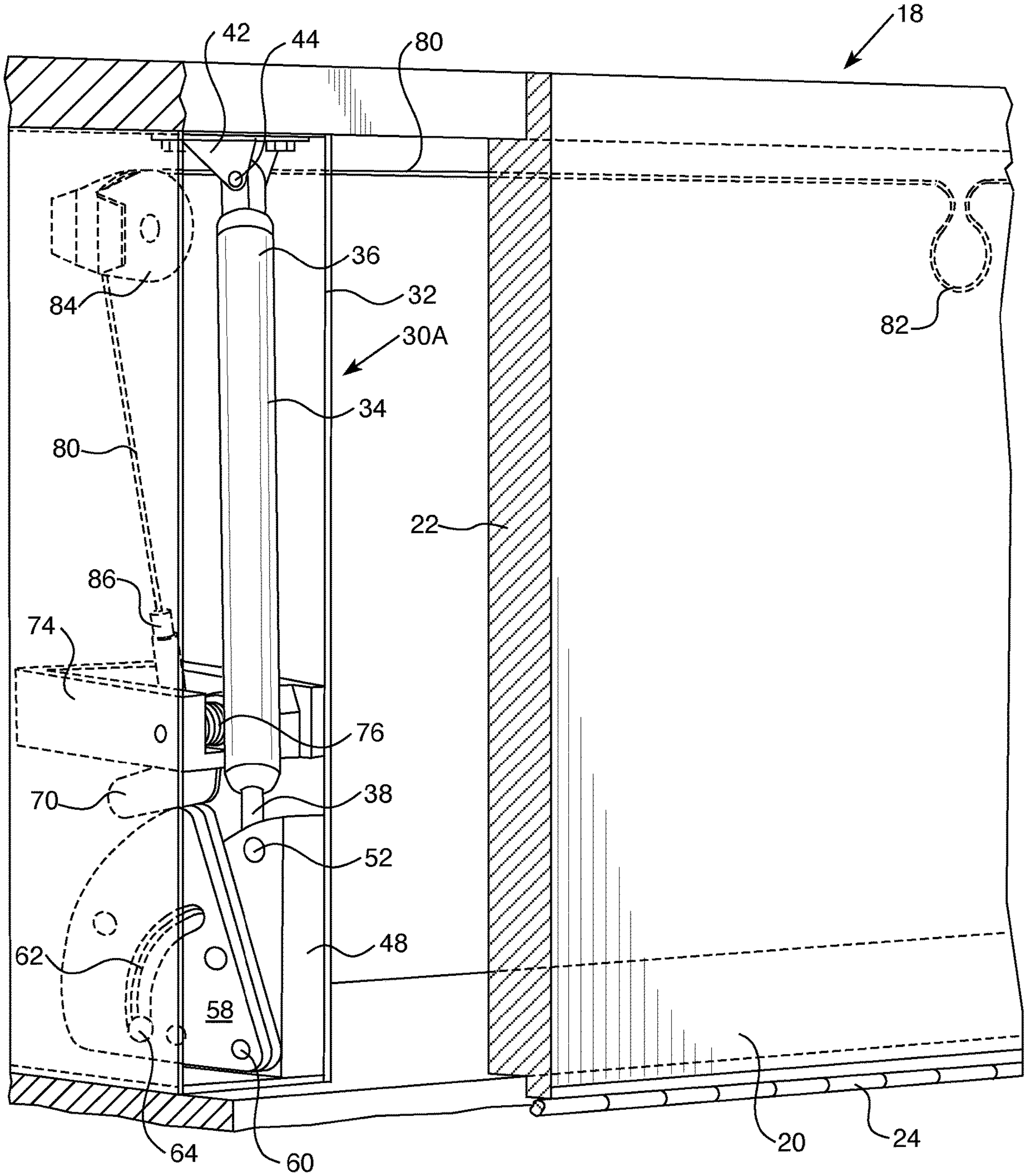
FIG. 4 is a close-up perspective view of the compartment of the vehicle of FIG. 1 with the door closed, with a portion of the door and most of the vehicle cutaway to show a left side one of the door swing control devices of FIG. 2.
Figure 5:
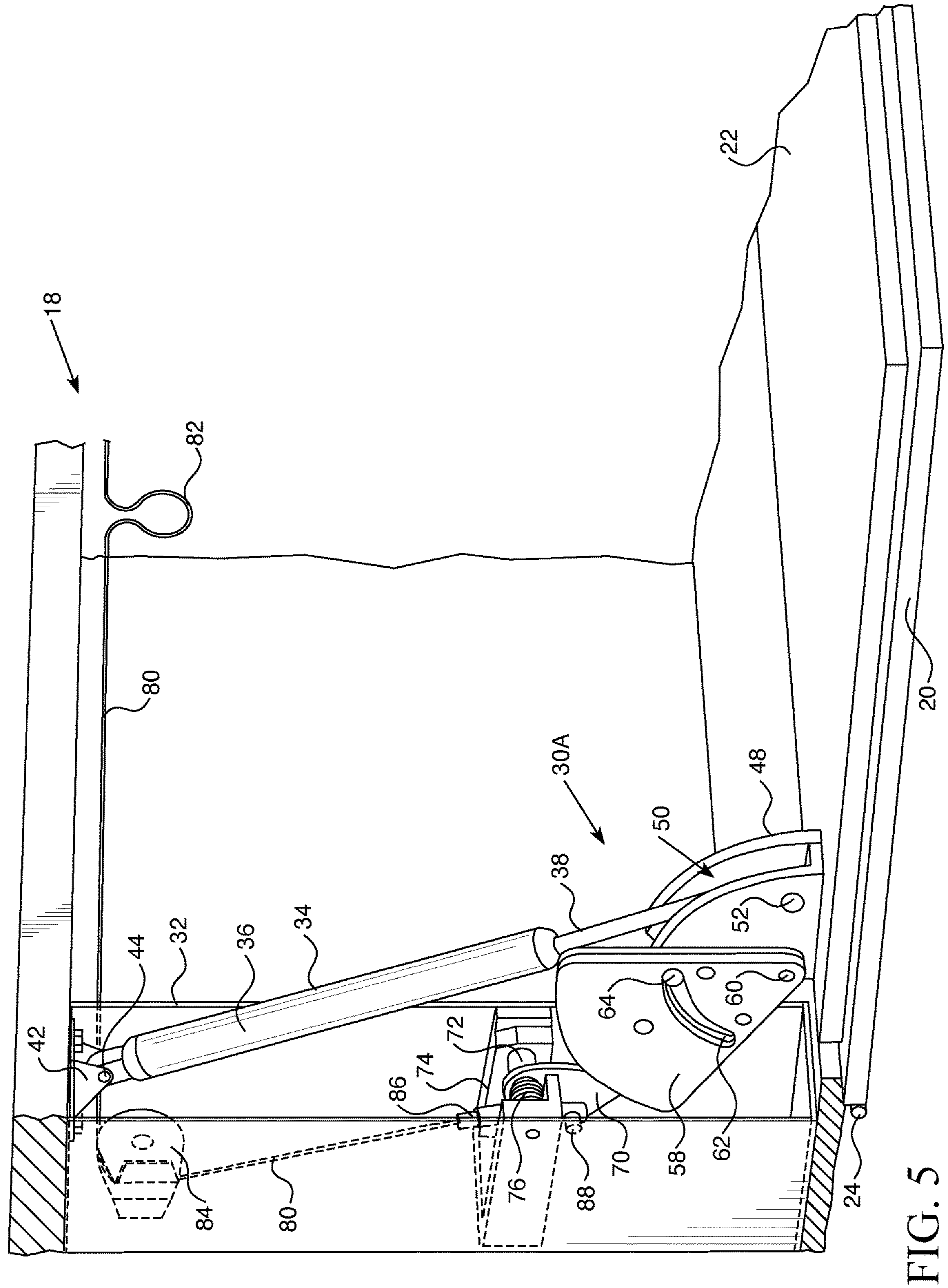
FIG. 5 is a close-up perspective view of the compartment of the vehicle of FIG. 1 with the door open to the first position, with a portion of the door and most of the vehicle cutaway to show a left side one of the door swing control devices of FIG. 2.

The finger 70 is selectively pivotable between an engaged position (pointing generally downward, as seen in FIG. 5) in which the finger is engaged with the pivoting element (seen in FIG. 5) and a disengaged position (pivoted upward and backward, as seen in FIG. 4) in which the finger 70 is disengaged from the pivoting element 58. The finger 70 is biased toward the engaged position by biasing spring 76 or any other suitable biasing mechanism.

Figure 8:
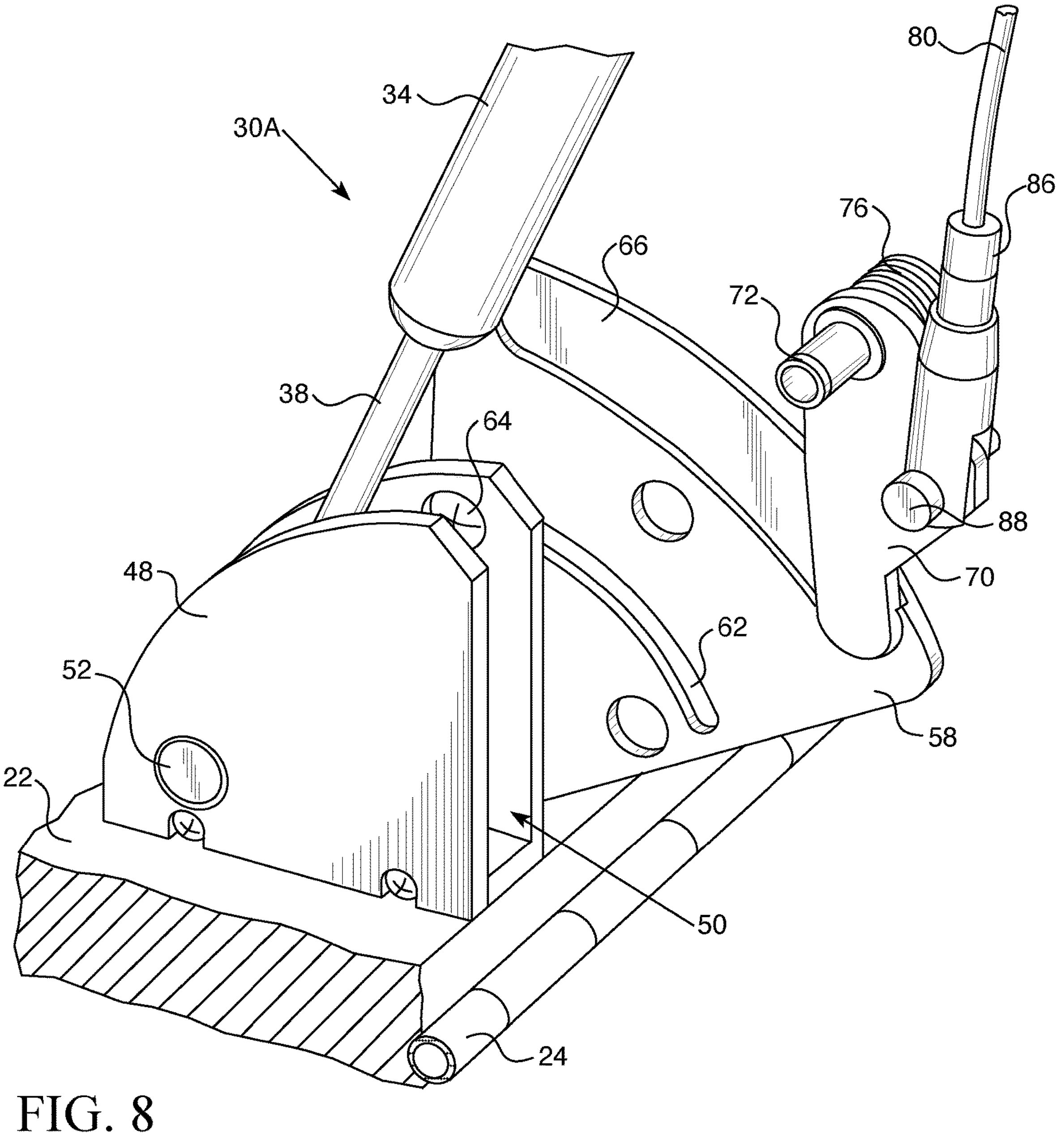
FIG. 8 is a close-up perspective view of a portion of the left side one of the door swing control devices of FIG. 2.

A channel 66 is defined in the distal end of the pivoting element 58. The channel is seen in FIG. 8, in which the half of the pivoting element 58 that is toward the bracket 48 is removed to better show the interior of the channel 66. The finger 70 is slidably engaged with the distal end channel 66 when the finger 70 is in the engaged position. The finger engages a first end of the channel 66 (seen in FIG. 8) when the finger 70 is in the engaged position and the door 20 is in the first open position to prevent the door 20 from moving to the second open position until the finger 70 is disengaged.

To move the finger 70 upward to the disengaged position, a pull cable 80 (preferably with a grasping ring 82 or the like) is accessible within the compartment. The pull cable is attached to the finger 70 via cable bracket 86 attached a pivot point 88. The cable 80 enters the housing 32 via a hole (not visible) in the side of the housing, and a pulley 84 or the like redirects the cable 80 toward the finger 70. Thus, when a user pulls on the grasping ring 82 of the cable 80, the finger 70 is pulled/pivoted upward into its disengaged position.

Figure 7:
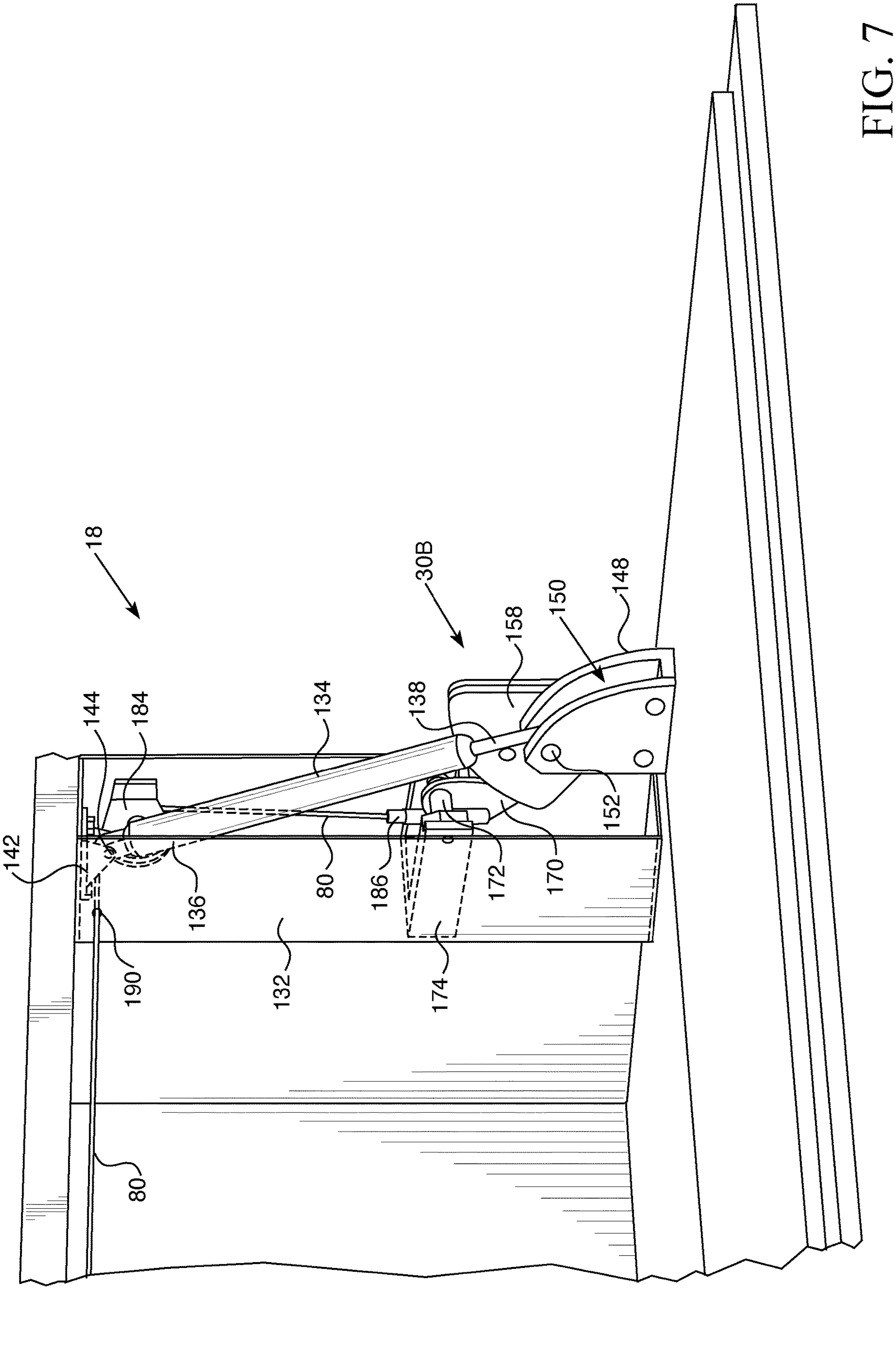
FIG. 7 is a close-up perspective view of the compartment of the vehicle of FIG. 1 with the door open to the first position, with a portion of the door and most of the vehicle cutaway to show a right side one of the door swing control devices of FIG. 2.

As indicated above, the right side device 30B is a mirror image of the left side device 30A, and is illustrated in FIG. 7. As seen in FIG. 7, right side door swing control device 30B comprises a bracket 148 that is affixed to the door 20. The bracket 148 comprises two parallel walls defining a space 150 therebetween. The right side device 30B comprises a pivoting element 158 that is pivotably affixed to the bracket 148 (or alternatively may be pivotably affixed to the door 20), via a pivot point (not visible in FIG. 7). A pin (not visible in FIG. 7) protrudes from the bracket 148 that is slidably engaged with an arcuate channel (not visible in FIG. 7) defined in the pivoting element 158. The right side device 30B comprises a pneumatic strut 134 or the like that is pivotably affixed to the interior of the compartment (via mounting bracket 142 and pivot point 144) and is pivotably affixed to the door 20 (via pivot point 152 and the bracket 148) (the strut could optionally be affixed to the compartment and/or the door in any other suitable manner). The strut 134 comprises a main pneumatic housing 136 and an extendible piston 138, as is conventionally known. The right side device 30A comprises a finger 170 that is pivotably affixed to an axle 172, which in turn is affixed to a mounting bracket 174, which in turn is affixed to the housing 132. The pull cable 80 is attached to the finger 170 via cable bracket 186 attached a pivot point (not visible in FIG. 7). The cable 80 enters the housing 132 via a hole 190 in the side of the housing, and a pulley 184 or the like redirects the cable 80 toward the finger 170.

The operation of the door swing control device of embodiments of the invention will now be described. The operation will be described only related to the left side door swing control device 30A, but the same steps/movements/etc. will occur simultaneously in the right side door swing control device 30B. When the door 20 is closed (as seen in FIG. 4), the closing motion of the door pivots the attached bracket 48 into the housing 32 (as seen in FIG. 4), As the bracket 48 pivots toward the housing, the pin 64 slides along the channel 62 until the pin 64 reaches the inside end of the channel 62 (i.e., the position seen in FIG. 4), at which point the pin 64 pushes the pivoting element 58 to cause the pivoting element 58 to also pivot into the housing 32 (as seen in FIG. 4). The movement of the pivoting element 58 into the housing 32 pushes the finger 70 upward and backward into its disengaged position. Also as the bracket 48 pivots toward the housing, the strut 34 pivots toward a vertical (or near vertical) position and into the housing 32. The movement of the bracket 48, the pivoting element 58, and the strut 34 into the housing enables the door 20 to close flush.

As the door is opened, the door 20 and the bracket 48 pivot outward. The outward movement of the bracket 48 causes the bottom end of the strut 34 to pivot outward and the extendible piston 38 to extend downward from the strut housing 36, which controls the opening speed of the door 20. The outward movement of the bracket 48 causes the pin 64 to slide along the channel 62 until the pin 64 reaches the outside end of the channel 62 (i.e., the position seen in FIG. 5), at which point the pin 64 pushes the pivoting element 58 to cause the pivoting element 58 to also pivot outward from the housing 32 (as seen in FIG. 5). As the pivoting element 58 pivots outward from the housing 32, the biasing spring 76 pushes the finger 70 downward and forward such that the tip of the finger 70 enters the channel 66 in the distal end of the pivoting element 58. As the door 20 continues toward the first open position (and the bracket 48 and the pivoting element 58 move along with the door 20), the finger 70 will eventually engage with the inside end (i.e., toward the compartment) of the channel 66, thereby preventing further outward movement of the pivoting element 58, the bracket 48, and the door 20 (as seen in FIG. 8). At this point, the finger 70 is in the engagement position and the door 20 is stopped in the first open position.

Figure 6:
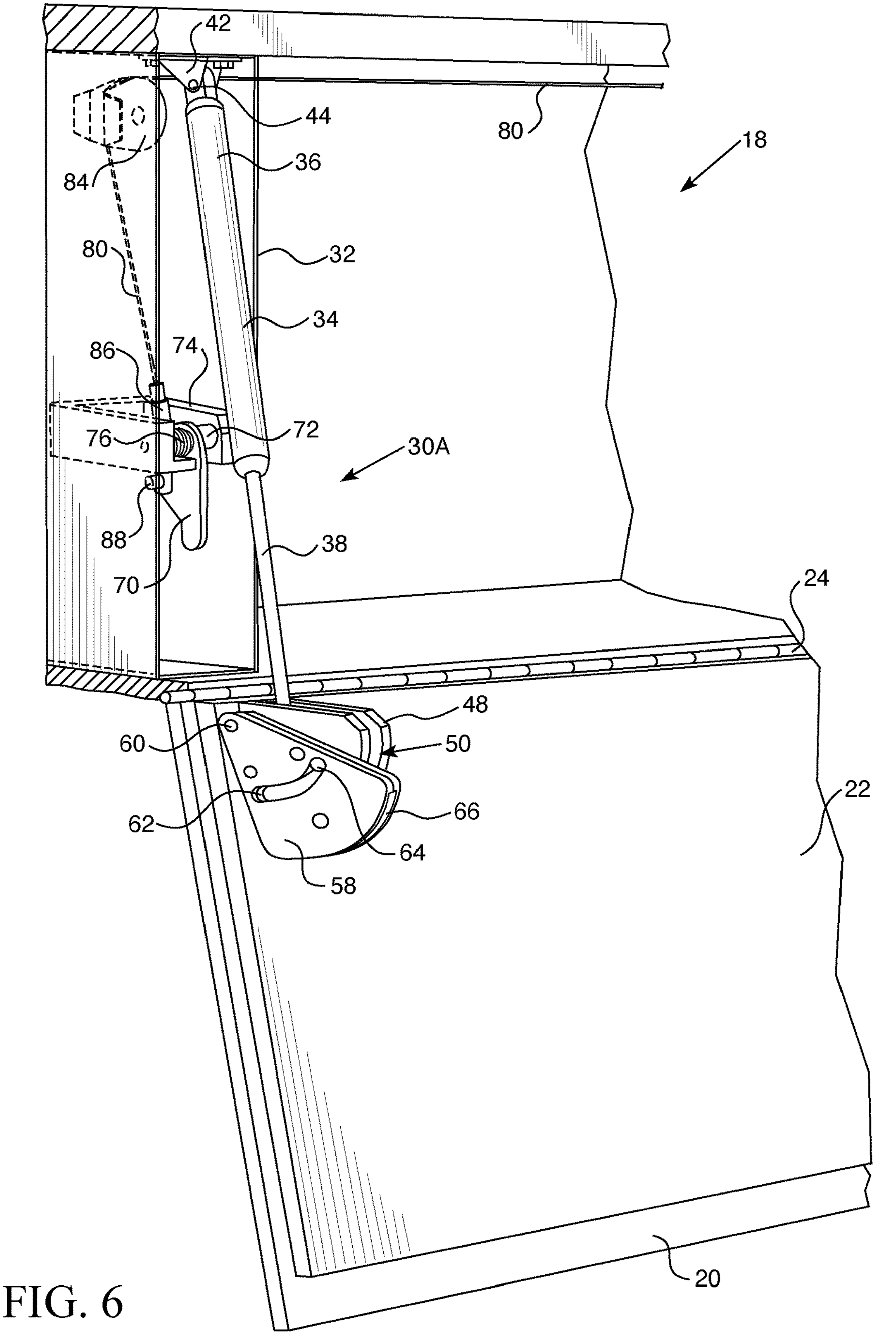
FIG. 6 is a close-up perspective view of the compartment of the vehicle of FIG. 1 with the door open to the second position, with a portion of the door and most of the vehicle cutaway to show a left side one of the door swing control devices of FIG. 2.

If a user wishes to open the door to the second open position, the user pulls on the grasping ring 82 of the cable 80 (depending on the contour of the channel 66, the user may need to move the door slightly upward to do this). Pulling on the cable 80 pivots the finger 70 upward/backward and out of engagement with the channel 66 of the pivoting element 58, such that the finger 70 is in its disengaged position (same position as seen in FIG. 4). With the finger 70 disengaged from the pivoting element 58, the door 20 is able to move past the first open position all the way to the second open position (seen in FIG. 6). As seen in FIG. 6, the pin 64 is now against the inside end of the channel 62, as the pivoting element 58 would fall toward the door 20 as the door 20 moves from the first open position to the second open position.

When the door 20 is closed from the fully open position, as the door 20 and the bracket 48 move upward, the pivoting element 58 is pivoted toward the compartment. When the pivoting element 58 begins to enter the housing 32, the finger 70 will re-enter the channel 66. As described above, the movement of the pivoting element 58 into the housing 32 pushes the finger 70 upward and backward into its disengaged position. When the door 20 is opened again, the finger 70 will again engage with the channel 66 of the pivoting element 58 as described above. Thus, each time the door 20 is closed, the door swing control device is "reset" such that with each opening of the door the door will be stopped at the first open position until/unless the user pulls the cable 80 to disengage the finger 70.

Figure 9:
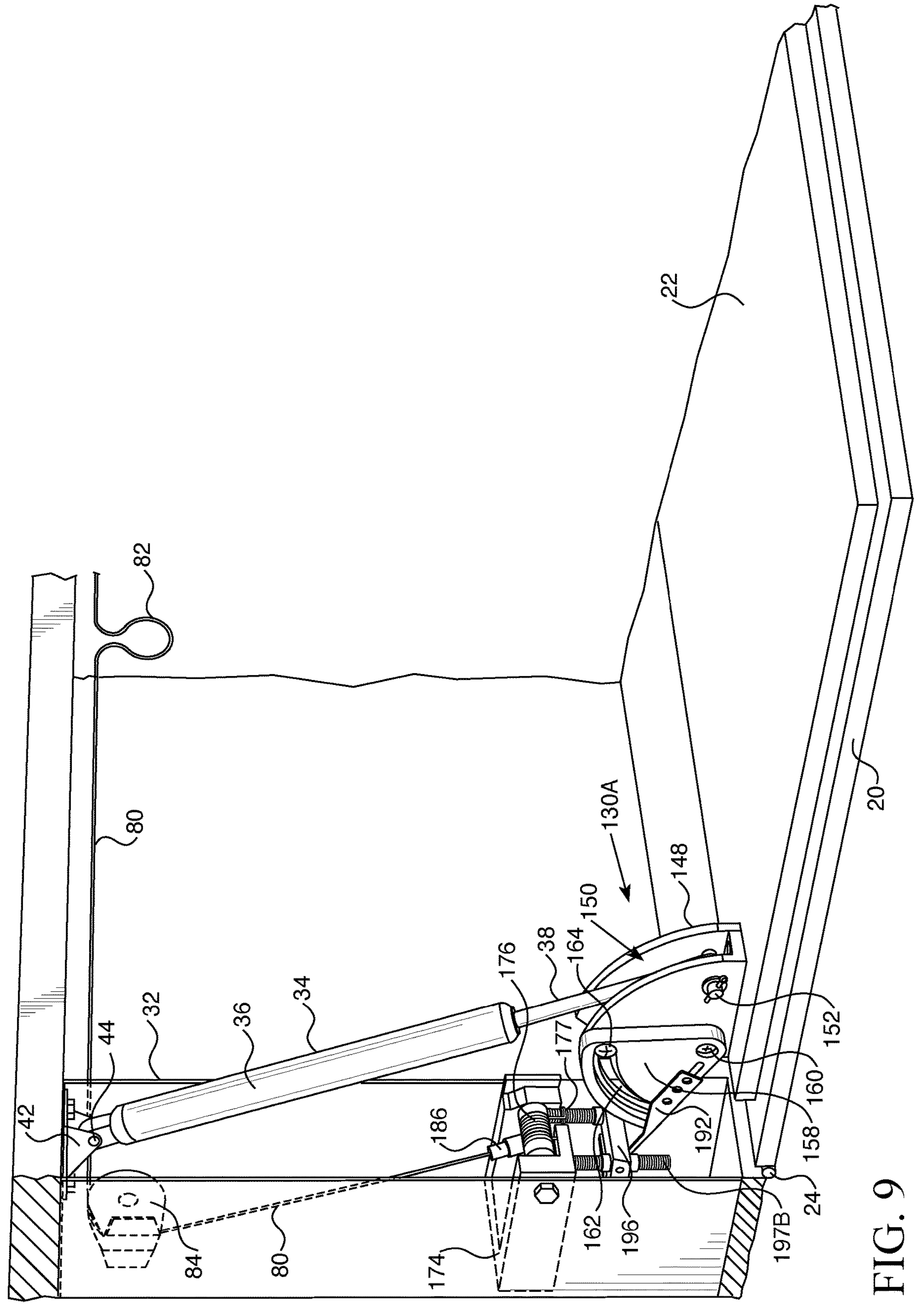
FIG. 9 is a close-up perspective view of the compartment of the vehicle of FIG. 1 with the door open to the first position, with a portion of the door and most of the vehicle cutaway to show a left side one of a door swing control device of alternative embodiments of the invention.
Figure 10:
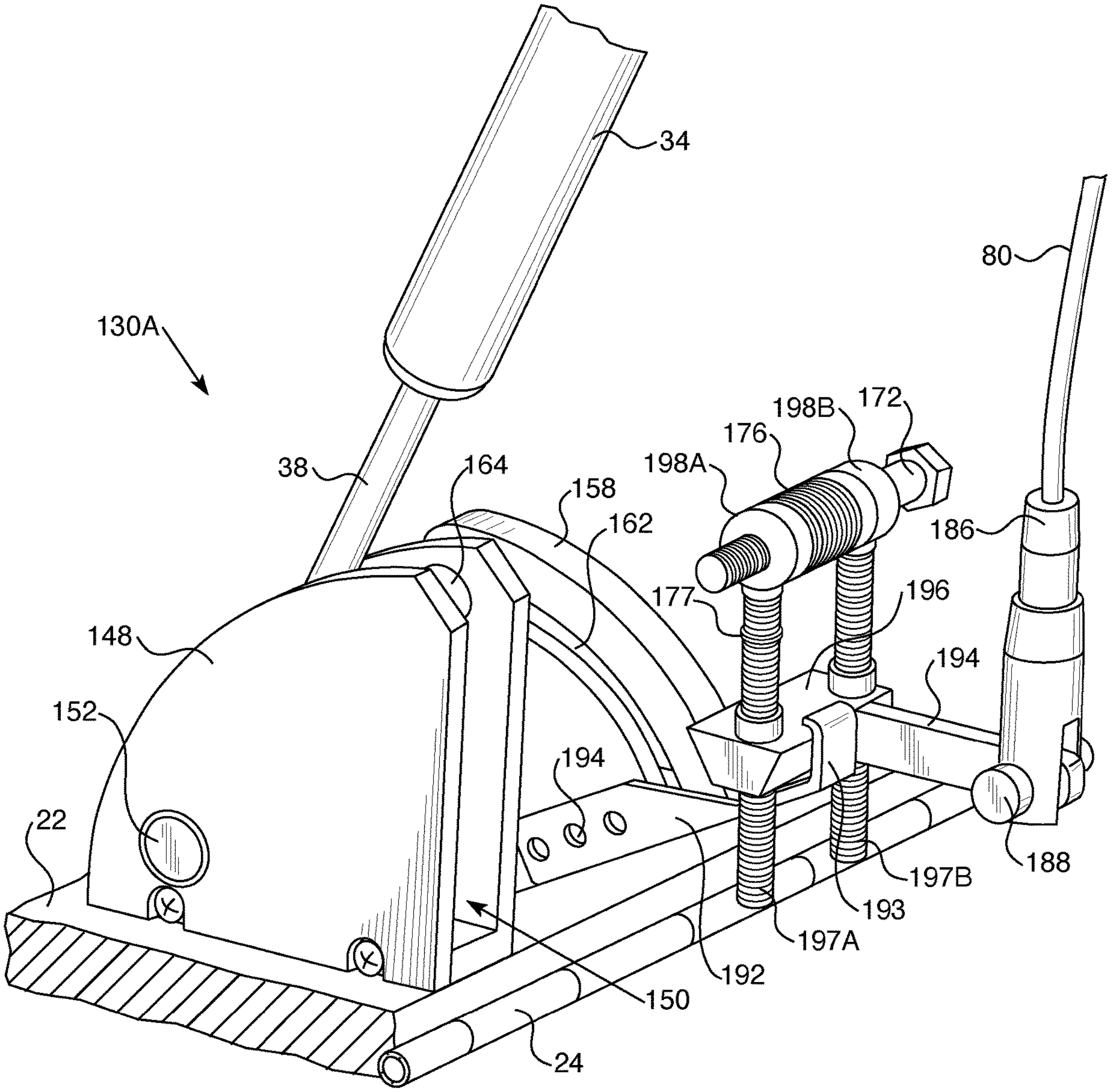
FIG. 10 is a close-up perspective view of a portion of the door swing control device of FIG. 9, in an engaged position.
Figure 11:
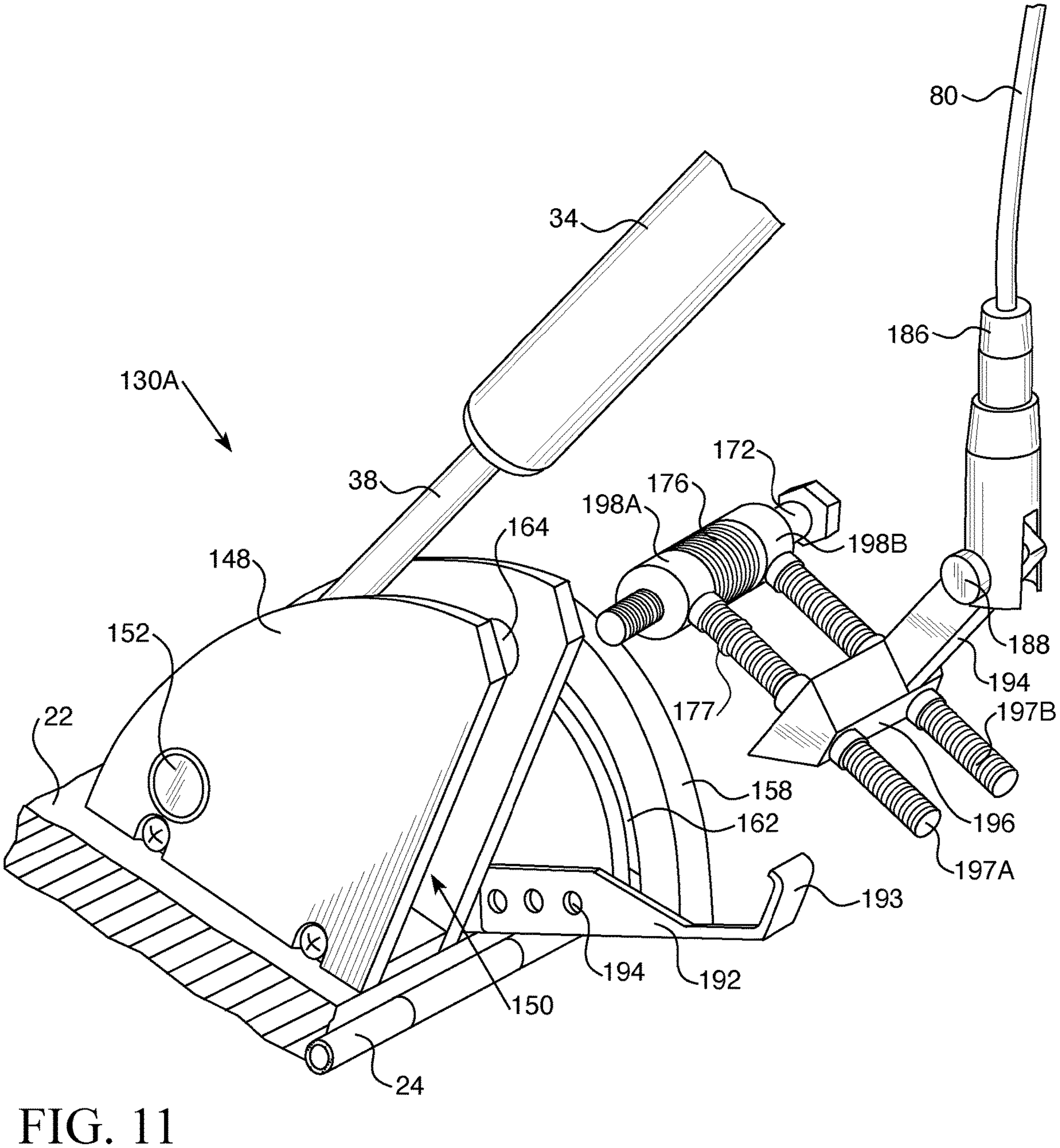
FIG. 11 is close-up perspective view of a portion of the door swing control device of FIG. 9, in a disengaged position.

FIG. 9-11 illustrate an alternative embodiment of the invention. As in the embodiment described above, a door swing control device of alternative embodiments of the invention may comprise a left side device 130A and a right side device (not illustrated). For simplicity, the structure and operation of only the left side device 130A will be described herein; however, the right side device is a mirror image of the left side device 130A.

The door swing control device 130A of alternative embodiments of the invention comprises one or more components that are mounted in the interior chamber of the compartment, one or more components that attach to the door 20, and one or more components that cooperate with the internal components and the door-mounted components. Some of the interior components of the door swing control device 130A are arranged in a housing 32 that is preconfigured to be installed in the interior chamber of the storage compartment. The housing 32 may be generally shaped as a rectangular box and will typically have left and right side walls, a top wall, and a floor as illustrated, and likely a rear wall, but will likely not have a front wall (some or all of the walls may be partial walls). The housing 32 is mounted to one or more of the respective inner side wall, the inner top wall, and/or the inner floor of the compartment using any suitable mounting fasteners or method of mounting.

The device 130A comprises a bracket 148 that is affixed to the door 20. In the illustrated embodiment, the bracket 148 comprises two parallel, quarter-circle-shaped walls defining a space 150 therebetween. The device 130A comprises a pivoting element 158 that is pivotably affixed to the bracket 148 (or alternatively may be pivotably affixed to the door 20), via pivot point 160. As described below, the pivoting element 158 engages with the bracket 148 to limit the range of movement of the pivoting element 158 relative to the bracket 148. The pivoting element 158 pivots relative to the bracket 148 between a first position (not illustrated specifically for device 130A, but the same position as is shown in FIG. 4) and a second position (shown in FIG. 9) as the door moves, respectively, between the closed position and the first open position. A pin 164 protrudes from the bracket 148 that is slidably engaged with an arcuate channel 162 defined in the pivoting element 158, such that the slidable engagement limits the range of movement of the pivoting element 158 relative to the bracket 148.

The device 130A comprises a pneumatic strut 34 or the like that is pivotably affixed to the interior of the compartment (via mounting bracket 42 and pivot point 44) and is pivotably affixed to the door 20 (via pivot point 152 and the bracket 148) (the strut could optionally be affixed to the compartment and/or the door in any other suitable manner). The strut 34 comprises a main pneumatic housing 36 and an extendible piston 38, as is conventionally known. The strut 34 is pivotably affixed at the second end to the bracket 148 such that a portion of the strut 34 (typically a portion of the piston 38) moves within a space between the two walls of the bracket 148 as the strut 34 moves relative to the bracket 148. The strut 34 controls the speed of the door 20 as the door 20 moves from the closed position to the first open position and/or from the first open position to the second open position.

The pivoting element 158 comprises a finger 192 projecting therefrom. The finger 192 has a hooked distal end 193. The distance that the distal end 193 projects from the pivoting element 158 may be adjustable, via any suitable adjustment mechanism. In the illustrated embodiment, the finger 192 comprises a plurality of adjustment holes 194 that engage with corresponding positioning pins (not illustrated) on the pivoting element, such that the distance that the distal end 193 projects from the pivoting element 158 may be adjusted by selecting which of the holes 194 are engaged by the positioning pins.

The finger 192 is selectively engageable with a swinging catch mechanism (best seen in FIGS. 10 and 11, which omit much of the mounting structure for simplicity and clarity) to selectively limit a range of movement of the pivoting element 158 relative to the swinging catch mechanism and thereby selectively limiting a range of movement of the bracket 148 relative to the swinging catch mechanism and selectively limiting a range of movement of the door 20. When the finger 192 of the pivoting element 158 is engaged with the swinging catch mechanism, the door 20 is maintained in the first open position. When the finger 192 of the pivoting element 158 is disengaged from the swinging catch mechanism, the door is able to swing between the first open position and the second open position.

In the illustrated embodiment, the swinging catch mechanism comprises an axle 172, which is affixed to a mounting bracket 174, which in turn is affixed to the housing 32 (the axle 172 and bracket 174 may be mounted using any suitable mechanism or method). The swinging catch mechanism further comprises one or more (two are shown) posts 197A, 197B pivotably affixed via attachment points 198A, 198B to the axle 172 and a finger-engaging bar 196 affixed to the posts 197A, 197B. The position of the finger-engaging bar 196 on the posts 197A, 197B may be adjustable via any suitable adjustment mechanism (such as nuts that engage with the threads of the posts 197A, 197B) to ensure that the finger-engaging bar 196 is appropriately positioned to selectively engage with the finger 192. The swinging catch mechanism is biased toward its engaged position (the position shown in FIG. 10) via any suitable biasing mechanism. In the illustrated embodiment, a biasing spring 176 encircles the axle 172 and has one end 177 that encircles post 197A.

To move the swinging catch mechanism upward to the disengaged position (shown in FIG. 11), a pull cable 80 (preferably with a grasping ring 82 or the like) is accessible within the compartment. The pull cable is attached to the finger-engaging bar 196 via a cable bracket 186 attached to a pivot point 188 which in turn is attached to an attachment bar 194. The cable 80 enters the housing 32 via a hole (not visible in FIG. 9) in the side of the housing, and a pulley 84 or the like redirects the cable 80 toward the swinging catch mechanism. Thus, when a user pulls on the grasping ring 82 of the cable 80, the swinging catch mechanism is pulled/pivoted upward into its disengaged position. When a user releases the grasping ring 82, the swinging catch mechanism is biased to pivot back to its engaged position.

The finger 192 is selectively engageable with the finger-engaging bar 196 of the swinging catch mechanism to selectively limit a range of movement of the pivoting element 58 relative to the swinging catch mechanism and thereby selectively limit a range of movement of the bracket 48 relative to the swinging catch mechanism and selectively limit movement of the door 20. When the door is opened to the first open position, the finger 192 engages with the finger-engaging bar 196 of the swinging catch mechanism to hold the door in the first open position. When the finger 192 is disengaged from the finger-engaging bar 196 of the swinging catch mechanism, the device 130A allows the door 20 to swing between the first open position and the second open position.

The operation of the door swing control device of alternative embodiments of the invention will now be described. The operation will be described only related to the left side door swing control device 130A, but the same steps/movements/etc. will occur simultaneously in a right side door swing control device (if present). When the door 20 is closed, the closing motion of the door pivots the attached bracket 148 into the housing 32. As the bracket 148 pivots toward the housing, the pin 164 slides along the channel 162 until the pin 164 reaches the inside end of the channel 162, at which point the pin 164 pushes the pivoting element 158 to cause the pivoting element 158 to also pivot into the housing 32. The movement of the pivoting element 158 into the housing 32 pushes the finger-engaging bar 196 and therefore the swinging catch mechanism upward and backward into its disengaged position. Also as the bracket 148 pivots toward the housing, the strut 34 pivots toward a vertical (or near vertical) position and into the housing 32. The movement of the bracket 148, the pivoting element 158, and the strut 34 into the housing enables the door 20 to close flush.

As the door is opened, the door 20 and the bracket 148 pivot outward. The outward movement of the bracket 148 causes the bottom end of the strut 34 to pivot outward and the extendible piston 38 to extend downward from the strut housing 36, which controls the opening speed of the door 20. The outward movement of the bracket 148 causes the pin 164 to slide along the channel 162 until the pin 164 reaches the outside end of the channel 162, at which point the pin 164 pushes the pivoting element 158 to cause the pivoting element 158 to also pivot outward from the housing 32. As the pivoting element 158 pivots outward from the housing 32, the biasing spring 176 pushes the swinging catch mechanism downward and forward into the engaged position (shown in FIG. 10). As the door 20 continues toward the first open position (and the bracket 148 and the pivoting element 158 move along with the door 20), the hooked distal end 193 of the finger 192 will eventually engage with the finger-engaging bar 196 of the swinging catch mechanism (as shown in FIG. 10), thereby preventing further outward movement of the pivoting element 158, the bracket 148, and the door 20. At this point, the door 20 is stopped in the first open position and cannot move past the first open position to the second open position.

If a user wishes to open the door to the second open position, the user raises the door 20 slightly to disengage the finger 192 from the finger-engaging bar 196 of the swinging catch mechanism and then pulls on the grasping ring 82 of the cable. Pulling on the cable 80 pivots the swinging catch mechanism upward/backward to the position shown in FIG. 11, such that the finger-engaging bar 196 is no longer in position to engage the finger 192. With the finger-engaging bar 196 now out of the path of the finger 192, the door 20 is able to move past the first open position all the way to the second open position.

When the door 20 is closed from the fully open position, as the door 20 and the bracket 148 move upward, the pivoting element 158 and finger 192 are pivoted toward the compartment. As the door 20 continues to close, first the finger 192 and then the pivoting element 158 push the swinging catch mechanism upward/backward into its disengaged position to enable the door 20 to fully close. When the door 20 is opened again, the finger 192 will again engage with the finger-engaging bar 196 of the swinging catch mechanism as described above. Thus, each time the door 20 is closed, the door swing control device is "reset" such that with each opening of the door the door will be stopped at the first open position until/unless the user pulls the cable 80 to disengage the finger 70.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A door swing control device adapted to enable a door that is hingedly affixed to a structure to swing between a closed position and a first open position and between the first open position and a second open position, the device comprising:

a bracket adapted to be affixed to the door;

a pivoting element pivotably affixed to the bracket or adapted to be pivotably affixed to the door, the pivoting element engaged with the bracket to limit a range of movement of the pivoting element relative to the bracket, the pivoting element comprising a finger extending therefrom; and a swinging catch mechanism adapted to be mounted directly or indirectly to the structure, the finger of the pivoting element being selectively engageable with the swinging catch mechanism to selectively limit a range of movement of the pivoting element relative to the swinging catch mechanism and hereby selectively limiting a range of movement of the bracket relative to the swinging catch mechanism;

wherein, when the finger is engaged with the swinging catch mechanism, the device is adapted to hold the door to swing in the first open position;

wherein, when the finger is disengaged from the swinging catch mechanism, the device is adapted to allow the door to swing between the first open position and the second open position;

a strut adapted to restrain movement of the door from the closed position to the first open position and/or from the first open position to the second open position, the strut being (a) adapted to be pivotably affixed at a first end to the structure and (b) pivotably affixed at a second end to the bracket or adapted to be pivotably affixed at the second end to the door;

wherein the pivoting element is adapted to pivot relative to the bracket between a first position and a second position as the door moves, respectively, between the closed position and the first open position; and wherein the bracket comprises a pin protruding from the bracket that is slidably engaged with an arcuate channel defined in the pivoting element such that the slidable engagement limits the range of movement of the pivoting element relative to the bracket.

2. The device of claim 1, wherein the bracket comprises two parallel walls defining a space therebetween;

wherein the strut is pivotably affixed at the second end to the bracket such that a portion of the strut moves within a space between the two walls of the bracket as the strut moves relative to the bracket.

3. The device of claim 1, wherein the swinging catch mechanism is selectively pivotable between an engaged position in which the finger of the pivoting element is engaged with the swinging catch mechanism and a disengaged position in which the finger of the pivoting element is disengaged from the swinging catch mechanism.

4. The device of claim 3, wherein the swinging catch mechanism is biased toward the engaged position.

5. The device of claim 1, wherein the finger of the pivoting element has a hooked distal end;

wherein the swinging catch mechanism comprises a horizontal axle, one or more posts pivotably affixed to the axle, and a finger-engaging bar affixed to the one or more posts;

wherein the finger of the pivoting element is selectively engageable with the finger-engaging bar.

6. The device of claim 5, further comprising a release mechanism affixed to the finger-engaging bar to selectively pivot the finger-engaging bar and thereby pivot the swinging catch mechanism from its engaged position to its disengaged position.

7. A method of controlling a swing of a door that is hingedly affixed to a structure between a closed position and a first open position and between the first open position and a second open position, the method comprising:

affixing a bracket of a door swing control device to the door;

pivotably affixing a pivoting element of the door swing control device to the bracket or to the door, the pivoting element engaged with the bracket to limit a range of movement of the pivoting element relative to the bracket, the pivoting element comprising a finger extending therefrom; and affixing a swinging catch mechanism of the door swing control device directly or indirectly to the structure, the finger of the pivoting element being selectively engageable with the swinging catch mechanism to selectively limit a range of movement of the pivoting element relative to the swinging catch mechanism and thereby selectively limiting a range of movement of the bracket relative to the swinging catch mechanism;

wherein, when the finger is engaged with the swinging catch mechanism, the door is able to swing between the closed position and the first open position;

wherein, when the finger is disengaged from the swinging catch mechanism, the door is able to swing between the first open position and the second open position;

pivotably affixing a first end of a strut to the structure and pivotably affixing a second end of the strut to the bracket or to the door;

wherein the strut restrains movement of the door from the closed position to the first open position and/or from the first open position to the second open position;

wherein the pivoting element pivots relative to the bracket between a first position and a second position as the door moves, respectively, between the closed position and the first open position; and wherein a pin protruding from the bracket is slidably engaged with an arcuate channel defined in the pivoting element such that the slidable engagement limits the range of movement of the pivoting element relative to the bracket.

8. The method of claim 7, wherein the bracket comprises two parallel walls defining a space therebetween;

wherein the strut is pivotably affixed at the second end to the bracket such that a portion of the strut moves within a space between the two walls of the bracket as the strut moves relative to the bracket.

9. The method of claim 7, wherein the swinging catch mechanism is selectively pivotable between an engaged position in which the finger of the pivoting element is engaged with the swinging catch mechanism and a disengaged position in which the finger of the pivoting element is disengaged from the swinging catch mechanism.

10. The method of claim 9, wherein the swinging catch mechanism is biased toward the engaged position.

11. The method of claim 10, wherein the finger of the pivoting element has a hooked distal end;

wherein the swinging catch mechanism comprises a horizontal axle, one or more posts pivotably affixed to the axle, and a finger-engaging bar affixed to the one or more posts;

wherein the finger of the pivoting element is selectively engageable with the finger-engaging bar.

12. The method of claim 11, further comprising a release mechanism affixed to the finger-engaging bar to selectively pivot the finger-engaging bar and thereby pivot the swinging catch mechanism from its engaged position to its disengaged position.

* * * * *